US010942515B2

United States Patent
Salour et al.

(10) Patent No.: US 10,942,515 B2
(45) Date of Patent: *Mar. 9, 2021

(54) MULTI-SENSOR SAFE PATH SYSTEM FOR AUTONOMOUS VEHICLES

(71) Applicant: The Boeing Company, Chicago, IL (US)

(72) Inventors: Ali Salour, Fenton, MO (US); Gregory S. Highland, St. Charles, MO (US); Lori S. Smith, Orting, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,556

(22) Filed: Jun. 24, 2019

(65) Prior Publication Data

US 2019/0310626 A1    Oct. 10, 2019

Related U.S. Application Data

(63) Continuation of application No. 15/845,559, filed on Dec. 18, 2017, now Pat. No. 10,394,234.

(51) Int. Cl.
  *G05D 1/00*  (2006.01)
  *G05D 1/02*  (2020.01)

(52) U.S. Cl.
  CPC .......... *G05D 1/0033* (2013.01); *G05D 1/024* (2013.01); *G05D 1/0214* (2013.01); *G05D 1/0246* (2013.01); *G05D 1/0274* (2013.01); *G05D 1/0289* (2013.01); *G05D 1/0297* (2013.01); *G05D 2201/0216* (2013.01)

(58) Field of Classification Search
  CPC .... G05D 1/0033; G05D 1/0214; G05D 1/024; G05D 1/0246; G05D 1/0274; G05D 1/0289; G05D 1/0297; G05D 2201/0216
  USPC .......................................................... 701/26
  See application file for complete search history.

(56) References Cited

U.S. PATENT DOCUMENTS

| 4,779,203 A | 10/1988 | McClure et al. |
| 4,926,103 A | 5/1990 | Summerville et al. |
| 5,280,431 A | 1/1994 | Summerville et al. |
| 5,627,616 A | 5/1997 | Sergeant et al. |
| 7,436,429 B2 | 10/2008 | Tillotson |
| 7,643,893 B2 | 1/2010 | Troy et al. |
| 8,204,681 B2 | 6/2012 | Hirose |

(Continued)

FOREIGN PATENT DOCUMENTS

WO    0223297 A1    3/2002

OTHER PUBLICATIONS

Office Action for related European Application No. 18198851.0; report dated Jul. 6, 2020.

(Continued)

*Primary Examiner* — Gertrude Arthur Jeanglaude
(74) *Attorney, Agent, or Firm* — von Briesen & Roper, s.c.

(57) ABSTRACT

Systems and methods for guiding autonomous vehicles by monitoring the entire planned path and sending alert messages to a vehicle management system for delays, reroute, or emergency stop to avoid collision with an obstruction. The system initiates alternative paths when the primary path is blocked and is capable of reporting a vehicle identifier and the current positions of the vehicle and any obstruction along the planned path of the autonomous vehicle.

20 Claims, 11 Drawing Sheets

(56) References Cited

U.S. PATENT DOCUMENTS

| | | |
|---|---|---|
| 8,234,032 B2 | 7/2012 | Lee et al. |
| 8,315,789 B2 | 11/2012 | Dunbabin et al. |
| 8,346,468 B2 | 1/2013 | Emanuel et al. |
| 8,362,922 B2 | 1/2013 | Kushi et al. |
| 8,482,431 B2 | 7/2013 | Kushi et al. |
| 8,666,546 B2 | 3/2014 | Sarh et al. |
| 8,861,790 B2 | 10/2014 | Reeves |
| 9,562,779 B2 | 2/2017 | Lynch |
| 9,733,093 B2 | 8/2017 | Denaro |
| 10,394,234 B2 * | 8/2019 | Salour .................... G05D 1/024 |
| 2011/0218670 A1 | 9/2011 | Bell et al. |
| 2013/0190963 A1 | 7/2013 | Kuss et al. |
| 2015/0210274 A1 | 7/2015 | Clarke et al. |
| 2016/0259345 A1 | 9/2016 | McHale et al. |
| 2017/0176999 A1 | 6/2017 | Bobda |
| 2017/0252925 A1 | 9/2017 | Cho |

OTHER PUBLICATIONS

Shim, et al., "A Mobile Robot Localization via Indoor Fixed Remote Surveillance Cameras," Sensors (Basel), vol. 16, Issue 2, Feb. 2016.

Sensor networked mobile robotics project. http://cecas.clemson.edu/~ahoover/snr/.

Hoover, et al., "A Real-Time Occupancy Map from Multiple Video Streams", Proc. of IEEE Int'l Conf. on Robotics and Automation, Detroit, Michigan, May 1999. http://ieeexplore.ieee.org/document/770442/.

https://www.mathworks.com/help/robotics/examples/path-planning-in-environments-of-differentcomplexity.html?s_tid=gn_loc_drop.

Correll, "Introduction to Robotics #4: Path Planning", Correll Lab CU Computer Science, Sep. 14, 2011.

Extended European Search Report dated Apr. 1, 2019 in European Patent Application No. 18198851.0 (European counterpart of the instant patent application).

* cited by examiner

MULTI-SENSOR SAFE PATH SYSTEM FOR AUTONOMOUS VEHICLES

BACKGROUND

This disclosure generally relates to systems and methods for monitoring the movements of autonomous vehicles in warehouses and factories and taking actions to avoid collisions. As used herein, the term "autonomous vehicles" includes both automated guided vehicles (AGVs) that follow a fixed path and mobile robots which do not follow a fixed path.

Autonomous vehicles are equipped with collision detection sensors but the range in which they operate is limited to their on-board sensor's coverage area. This range is commonly designed to fit a uniform area around the vehicle and payload. Typically autonomous vehicles have safety features such as proximity sensors to stop the vehicle based on programmable distance or time to a blocking object. Also, vehicle location is calculated in relation to the last known node location embedded in the path. The drawback is that the vehicle can only sense collisions within a limited range around itself and is confined to the response time due to lack of information. In addition, there could be unplanned events in high traffic areas in which autonomous vehicles must co-exist with other production activities. A current solution lacks visibility to the entire path and controls ranges that can exceed the on-board sensors specified rating. There are other issues such as non-line-of-sight obstructions beyond doorways that the vehicle sensors cannot detect. The existing solution does not provide redundancy and in many cases requires an operator or spotter to follow the vehicle with a control pendant. This option adds additional labor and creates dependency based on human judgment instead of having a carefully orchestrated automated system.

SUMMARY

The subject matter disclosed in some detail below is directed to systems and methods for monitoring the entire planned path of an autonomous vehicle (i.e., an AGV or a mobile robot) and sending alert messages to a vehicle management system for delays, reroute, or emergency stop to avoid collision with an object or person. The system initiates alternative paths when the primary path of the autonomous vehicle is blocked and is capable of reporting a vehicle identifier and the current positions of the vehicle and any obstruction (e.g., a person or an object) along the planned path of the autonomous vehicle.

The following discussion will focus on systems and method for guiding AGVs, but many of the technical features disclosed in detail below also have application to guidance of mobile robots. The proposed system integrates a network of distributed cameras with an AGV system in which each AGV is already equipped with onboard sensors for use in collision avoidance. However, the sensor system onboard a typical AGV can only "see" a limited distance along the AGV path, not the entire planned path, which could be several thousand feet. The distributed cameras and an image processing server that processes the images acquired by those cameras enable visibility along the entire planned path in all directions, thereby significantly enhancing the AGV situational awareness and providing information not typically available from onboard sensors. In accordance with some embodiments, the system is configured to share object identification and human location information and expected collision time with an AGV so that a delay, reroute, or emergency-stop procedure can be executed by the AGV. More specifically, the AGV can respond appropriately with one of three responses: emergency stop, pause or reroute depending on what object is being detected, the location of that object and the length of time the path blockage has existed. Optionally, the proposed system also provides visual alerts to factory workers when an AGV is approaching around a blind corner.

In accordance with at least some embodiments, the AGV is notified of path blockage and then selects a reroute if appropriate. Currently, a typical AGV is programmed to pause indefinitely if there is a blockage in the path, but with the enhanced sensor capability disclosed herein, the AGV will be able to see the route blockage before the AGV initiates its route and eliminate any delays by selecting an alternative route. This enhanced situational awareness for AGVs is the result of synergistically integrating a sensor system with an AGV system. This additional capability gives the AGV the opportunity to eliminate delays, increase efficiency, keep production parts undamaged, as well as create a safer work environment for mechanics in the area. The integration and data exchange uniquely enhances production operations.

Although various embodiments of systems and methods for guiding AGVs will be described in some detail below, the technology applicable to both AGVs and mobile robots may be characterized by one or more of the following aspects.

One aspect of the subject matter disclosed in detail below is a method for guiding an autonomous vehicle (i.e., an AGV or a mobile robot) to avoid an obstruction, comprising: arranging a multiplicity of cameras to surveil an area intersected by a planned path of an autonomous vehicle; acquiring image data using the cameras while the autonomous vehicle is moving along the planned path in the area; processing the image data to detect a presence of and determine a current position of an object in the area; determining whether the object has a current position relative to a position of the autonomous vehicle that violates a constraint or not; if the object has a current position that violates the constraint, generating data representing vehicle guidance information; converting the data into vehicle guidance signals having a format acceptable to a vehicle management system configured for controlling movement of the autonomous vehicle; receiving the vehicle guidance signals at the vehicle management system; transmitting control signals from the vehicle management system to the autonomous vehicle which are a function of the received vehicle guidance signals; and discontinuing a current movement of the autonomous vehicle in response to receipt of the control signals.

In accordance with at least some embodiments of the method described in the preceding paragraph, the constraint is that the object not be in close proximity to the autonomous vehicle. For this constraint, the method further comprises: determining a current position of the autonomous vehicle along the planned path; determining a current separation distance separating the object and the autonomous vehicle; and determining whether the separation distance is less than a specified threshold or not. When the separation distance is less than the specified threshold, at least some of the vehicle guidance signals represent a command to initiate an emergency-stop procedure. In response to receipt of that command, the vehicle management system transmits control signals that cause the autonomous vehicle to stop.

In accordance with at least some embodiments, the constraint is that the object not be in an obstructing position along the planned path of the autonomous vehicle. For this constraint, at least some of the vehicle guidance signals represent a command to delay or slow down the autonomous vehicle when the object is in the obstructing position. In one proposed implementation, the method further comprises processing the image data to detect whether the autonomous vehicle is loaded or unloaded. If the autonomous vehicle is loaded, then the command to slow down the autonomous vehicle includes a predetermined rate designed for maximum loading of the autonomous vehicle. In another proposed implementation, the method further comprises: determining a current time interval during which the object has been in the obstructing position; and determining whether the current time interval is greater than a specified threshold or not, wherein if the current time interval exceeds the specified threshold, then at least some of the vehicle guidance signals represent routing data for an alternative path of the autonomous vehicle that avoids the object.

The foregoing method further comprises: processing the image data to detect a unique identifier on the autonomous vehicle; generating vehicle identification signals representing the unique identifier having a format acceptable to the vehicle management system; and transmitting the vehicle identification signals to the vehicle management system along with the vehicle guidance signals.

Another aspect of the subject matter disclosed in detail below is a system for guiding an autonomous vehicle (i.e., an AGV or a mobile robot), comprising: an autonomous vehicle configured to travel along a planned path that intersects an area; a vehicle management system configured for controlling movement of the autonomous vehicle; a multiplicity of cameras arranged to surveil the area; an image processing server connected to receive image data acquired by the multiplicity of cameras during surveillance of the area and configured to process the image data to detect a presence of and determine a current position of an object in the area; a path control server connected to receive processed data from the image processing server and configured to determine whether the object has a current position relative to a position of the autonomous vehicle that violates a constraint or not, and if the object has a current position that violates the constraint, generate data representing vehicle guidance information; and an interface configured to convert the data from the path control server into vehicle guidance signals having a format acceptable to the vehicle management system. The vehicle management system is communicatively coupled to receive the vehicle guidance signals from the interface and is configured to transmit control signals from the vehicle management system to the autonomous vehicle which are a function of the received vehicle guidance signals. The autonomous vehicle is communicatively coupled to receive the control signals from the vehicle management system and is configured to discontinue a current movement in response to receipt of the control signals.

In accordance with at least some embodiments of the system described in the preceding paragraph, the image processing server is further configured to determine a current position of the autonomous vehicle along the planned path, the constraint is that the object not be in close proximity to the current position of the autonomous vehicle, and the path control server is further configured to determine a current separation distance separating the object and the autonomous vehicle and then determine whether the separation distance is less than a specified threshold or not, wherein when the separation distance is less than the specified threshold, at least some of the vehicle guidance signals represent a command to initiate an emergency-stop procedure.

In accordance with at least some embodiments of the system, the constraint is that the object not be in an obstructing position along the planned path of the autonomous vehicle, and at least some of the vehicle guidance signals represent a command to delay or slow down the autonomous vehicle when the object is in the obstructing position. In addition, the path control server is further configured to: determine a current time interval during which the object has been in the obstructing position; determine whether the current time interval is greater than a specified threshold or not; and if the current time interval exceeds the specified threshold, determine an alternative path for the autonomous vehicle that avoids the object, wherein at least some of the vehicle guidance signals represent routing data for the alternative path.

In accordance with at least some embodiments of the system, the image processing server is further configured to process the image data to detect a unique identifier on the autonomous vehicle; and the interface is further configured to generate vehicle identification signals representing the unique identifier having a format acceptable to the vehicle management system.

A further aspect of the subject matter disclosed in detail below is a method for guiding an autonomous vehicle, comprising: acquiring path data representing a planned path to be traveled by the autonomous vehicle; arranging a multiplicity of cameras to surveil an area intersected by the planned path of the autonomous vehicle; acquiring image data using the cameras while the autonomous vehicle is moving along the planned path in the area; processing the image data to detect a presence of and determine a current position of an object in the area; determining whether the object in its current position obstructs the planned path of the autonomous vehicle or not; if the object obstructs the planned path of the autonomous vehicle, generating data representing vehicle guidance information; converting the data into vehicle guidance signals representing a command to alter a current movement of the autonomous vehicle having a format acceptable to a vehicle management system configured for controlling movement of the autonomous vehicle; receiving the vehicle guidance signals at the vehicle management system; transmitting control signals from the vehicle management system to the autonomous vehicle which are a function of the received vehicle guidance signals; and altering a current movement of the autonomous vehicle in response to receipt of the control signals.

Other aspects of systems and methods for guiding an autonomous vehicle are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
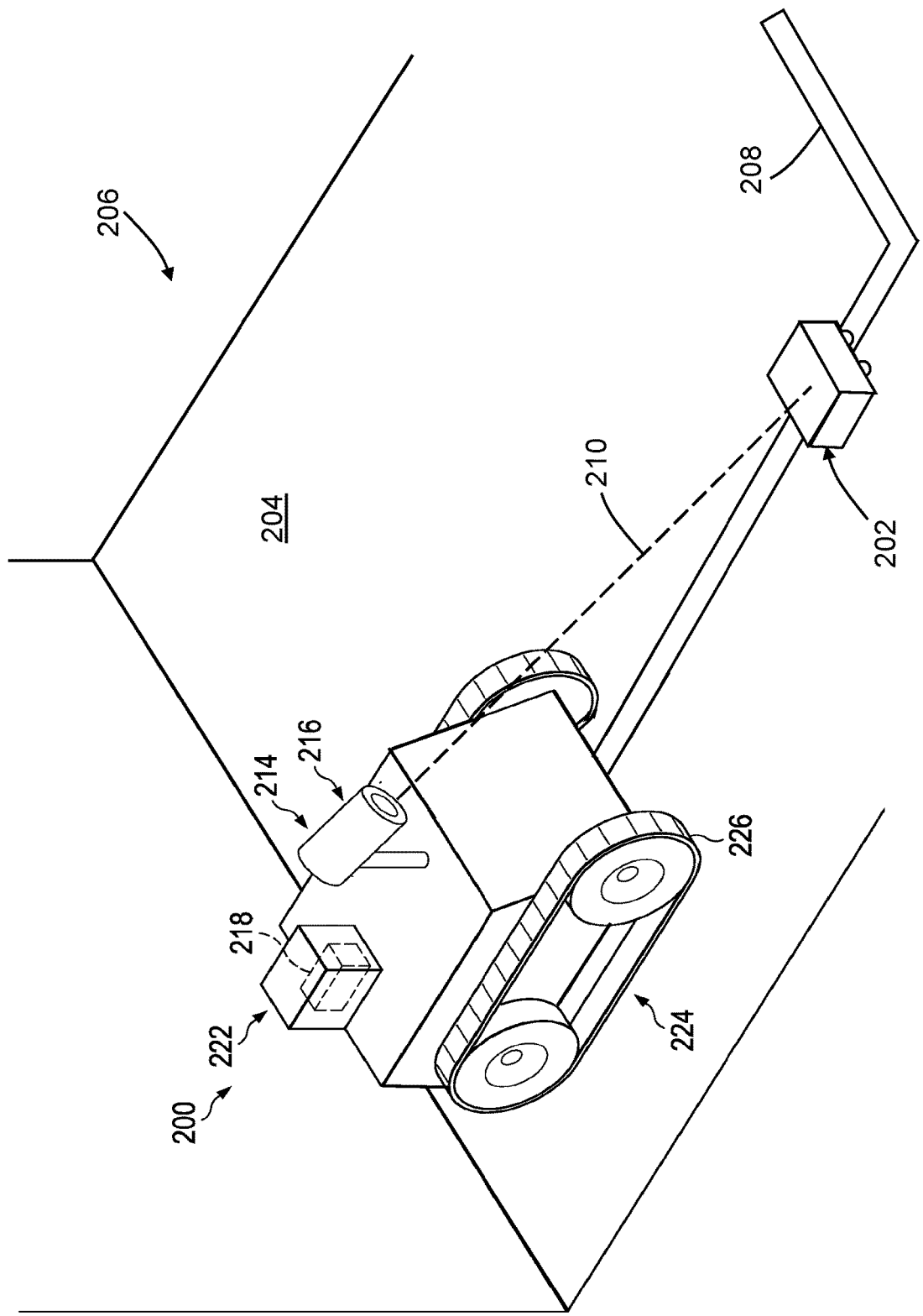
FIG. 1 is a diagram representing an orthographic view of a typical AGV having a guidance unit.

Illustrative embodiments of systems and methods for guiding autonomous vehicles are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The technology disclosed herein can be used to control AGVs or mobile robots to provide an alternative safe path or to cause the vehicle to delay or slow down when the primary path of an AGV or mobile robot is blocked by an obstacle or perform an emergency-stop procedure when a separation distance becomes less than a specified minimum (i.e., when a collision is possible or imminent). The various embodiments disclosed in some detail hereinafter incorporate one or more of the following features:

(1) The system detects obstructions within the planned path of the autonomous vehicle and then provides primary or secondary signals to the vehicle control. The primary signals can initiate emergency stops or reroute the vehicle to a new path. The secondary signals can be used to assist the vehicle control with time and speed variables.

(2) Cooperative sensor communication makes it possible to cover an entire path and detect beyond the range of the vehicle's on-board sensors.

(3) The system reviews the complete planned path of the autonomous vehicle in real time to initiate continuation or reroute to the vehicle management system.

(4) Vehicle load and time-to-stop data is calculated in real time and communicated to the vehicle management system. When this data is combined with the path status (clear or obstructed), the system can automatically initiate signals to continue, delay, reroute, or emergency stop. Time to stop is calculated from the vehicle weight with or without payload, average stopping time and maximum vehicle speed.

(5) The system has the capability to detect a unique identifier on the autonomous vehicle. This feature will identify the specific vehicle from the fleet and can report the status of the network of vehicles along their path.

(6) The system is configured to determine the status of loaded versus empty vehicles or tugs behind the vehicle using computer vision and other sensors attached to factory walls/ceilings along the vehicle path. All sensors are networked to a central control that monitors the vehicle path in an integrated way.

(7) The technology disclosed herein enables an external system outside of the vehicle control to communicate with the vehicle management system to add another layer of safety. This system will be comprised of a cluster of sensors with limited field of view; however, when integrated they are capable of tracking the same objects as they pass from one field of view to another. The combined safe path sensors can integrate and map out the complete path with vehicles and other objects in the path.

(8) A generic solution that is not dependent on a particular vehicle brand, make, or model. Control systems have interfaces configured to exchange messages in a two-way format. As an example, the vehicle speed can be communicated from the vehicle management system and utilized with load size and path status to initiate messages back to the vehicle management system for suggested delay, reroute or initiation of an emergency stop procedure.

The technology disclosed in some detail below adds an extra level of safety by interrogating an entire vehicle travel path that may include roll-up doors, tight corners and blind spots. In addition, the system is capable of sending early warning signals to the vehicle operating infrastructure when a path is blocked by objects that could interfere with clear and safe operation. The autonomous vehicle path is not visible to human eyes and could be easily blocked by other vehicles, pedestrians or materials. By managing the vehicle path, the system will operate smoothly by sending out early warning signals to the vehicle management system for changes in the speed or alternate routing of the autonomous vehicle whose planned path is obstructed. Data collected from sensors will evaluate possible collisions and can initiate emergency stops to avoid accidents or property damage.

For the purpose of illustration, a system for guiding AGVs will now be described in some detail. However, it should be appreciated that the concepts, methodologies and components described with reference to providing guidance to an AGV also have application in systems for guiding mobile robots. The prime difference between the two types of autonomous vehicles is that the planned path of an AGV must follow one of a multiplicity of pre-existing fixed paths, whereas the planned path of a mobile robot is not limited to travel along pre-existing fixed paths. More specifically, a mobile robot may travel in any direction from any position on a floor of a factory.

Automated guided vehicles (AGVs) may be used to perform different types of operations. For example, these types of vehicles may be used for towing objects, carrying loads, transporting materials, performing forklift operations, and/or performing other suitable types of operations. Typically, the path for an AGV is formed in or on the ground over which the AGV will move. As one illustrative example, a path may be formed by cutting a slot into the floor of a facility and embedding an electrically conductive wire in this slot. The AGV uses a sensor to detect a radio frequency signal transmitted from the wire. The AGV uses this detected radio frequency signal to follow the wire embedded in the floor. In the alternative, a magnetic bar may be embedded in the slot. In another illustrative example, a path is formed by placing tape on the ground. The tape may be, for example, without limitation, colored tape or magnetic tape. An AGV may use any number of sensors to follow the path formed by the tape. Some currently available AGVs use laser systems and/or three-dimensional imaging systems to follow pre-defined paths.

FIG. 1 is a diagram representing an orthographic view of a typical AGV 200 having a guidance unit 214. The AGV 200 is configured to move on the ground 204 in a manufacturing facility 206. In this illustrative example, magnetic bar 208 is embedded in the ground 204. The AGV 200 in turn is equipped with magnetic sensors that detect the presence of the magnetic bar 208. The magnetic bar 208 defines a path on the ground 204 along which the AGV 200 is to move. In this illustrative example, the AGV 200 has a guidance unit 214. The guidance unit 214 is configured to control and guide movement of the AGV 200. As depicted, the guidance unit 214 includes a sensor system 216 mounted to the AGV 200 and a motion controller 218.

For example, this sensor system 216 may comprise one or more laser scanners that scan for the presence of obstacles in the path of the AGV 200. Such a laser scanner may comprise an off-the-shelf laser-based distance measurement device, such as a laser range meter. Measurement data from the laser range meter can be used to obtain estimates of the respective distances from the laser range meter (i.e., from the AGV 200) to an obstacle in the AGV path. A typical laser range meter comprises a laser diode which transmits a bundled, usually visible, laser beam 210. In this example, the laser range meter may be mounted to a pan-tilt mechanism (not shown), which enables the laser range meter to be rotated about the pan and tilt axes. The light which is backscattered and/or reflected by the obstacle is imaged on the active surface of a photoreceiver by receiving optics. The laser diode has a position and an orientation which are fixed relative to the position and orientation of the video camera; the photoreceiver has a position and an orientation which are fixed relative to the position and orientation of the laser diode. The time-of-flight between transmission and reception of the light can be used by the motion controller 218 to calculate the distance between the laser range meter and the obstacle.

As depicted in FIG. 1, the motion controller 218 is implemented in a control system 222 onboard the AGV 200. In particular, this control system 222 may take the form of a computer or a processor in this illustrative example. The motion controller 218 is configured to guide the AGV 200 along the path defined by the magnetic bar 208. In particular, the motion controller 218 is configured to process the data from the sensor system 216. For example, in response to receiving sensor data representing an AGV-obstacle separation distance less than a specified threshold, the motion controller 218 may issue a command instructing the AGV 200 to stop or slow down. The motion controller 218 sends the commands to propulsion drive system 224 of the AGV 200. In this illustrative example, the propulsion drive system 224 is an endless track system 226. The propulsion drive system 224 moves the AGV 200 based on the commands received from the motion controller 218.

Figure 2:
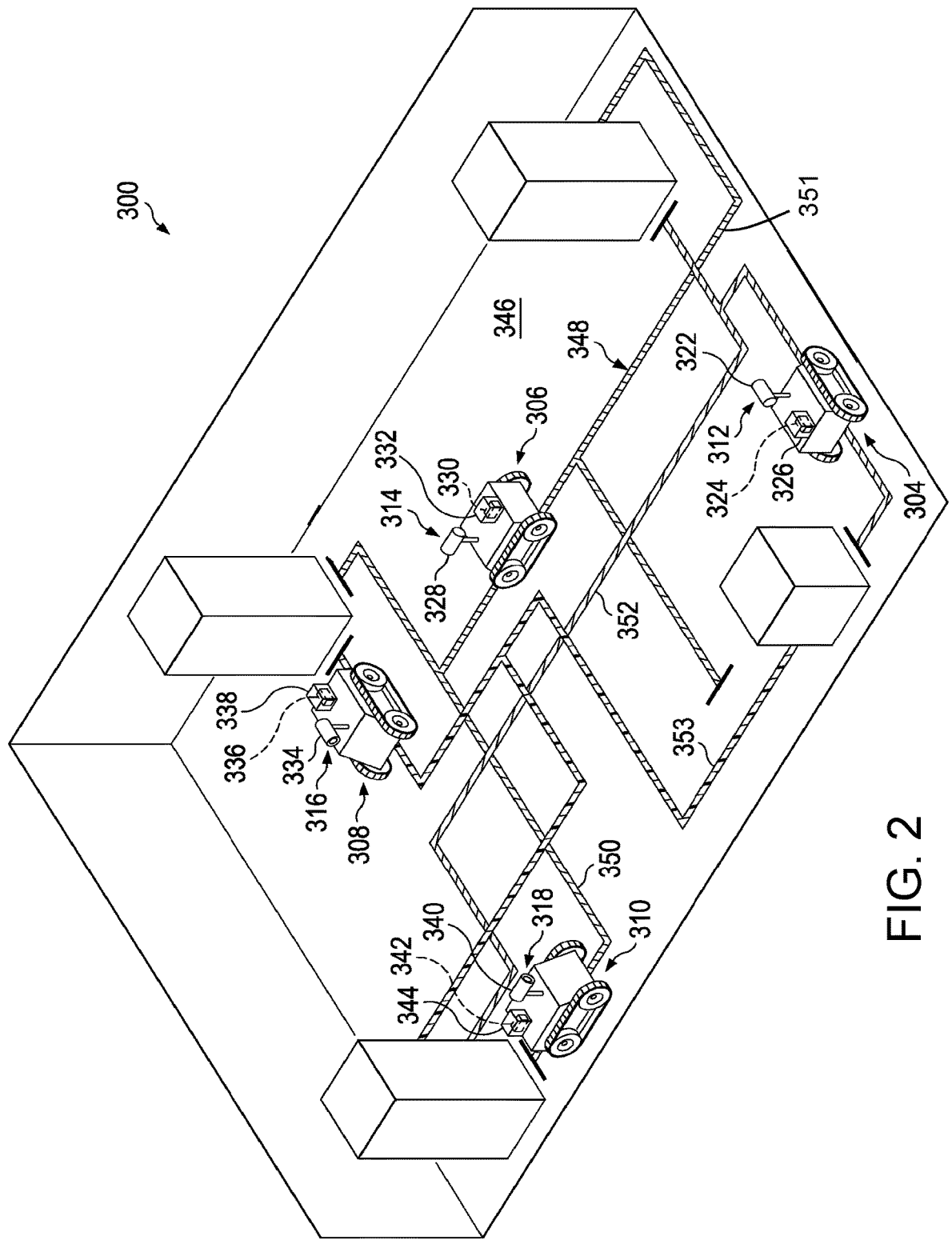
FIG. 2 is a diagram representing an orthographic view of a multiplicity of AGVs (of the type depicted in FIG. 1) moving inside a manufacturing facility.

FIG. 2 is a diagram representing an orthographic view of a multiplicity of AGVs (of the type depicted in FIG. 1) moving in a manufacturing facility 300. In this illustrative example, the mobile system includes a first AGV 304, a second AGV 306, a third AGV 308 and a fourth AGV 310. The guidance system is configured to steer the different AGVs throughout the manufacturing facility 300. The guidance system comprises a first guidance unit 312 configured to guide the first AGV 304, a second guidance unit 314 configured to guide the second AGV 306, a third guidance unit 316 configured to guide the third AGV 308, and a fourth guidance unit 318 configured to guide the fourth AGV 310. Each of these guidance units may be implemented in the same manner as the guidance unit 214 depicted in FIG. 1.

The first guidance unit 312 comprises a first sensor system 322 associated with the first AGV 304 and a first controller 324 implemented in a control system 326 for the first AGV 304. The second guidance unit 314 comprises a second sensor system 328 associated with the second AGV 306 and a second controller 330 implemented in a control system 332 for the second AGV 306. The third guidance unit 316 comprises a third sensor system 334 associated with the third AGV 308 and a third controller 336 implemented in a control system 338 for the third AGV 308. The fourth guidance unit 318 comprises a fourth sensor system 340 associated with the fourth AGV 310 and a fourth controller 342 implemented in a control system 344 for the fourth AGV 310. The guidance system is configured to guide the AGVs along different paths on the ground 346 of the manufacturing facility 300. The different paths are defined by a plurality 348 of magnetic bars on the ground 346. The magnetic bars 348 on the ground 346 may include, for example, magnetic bars 350-353.

Figure 3:
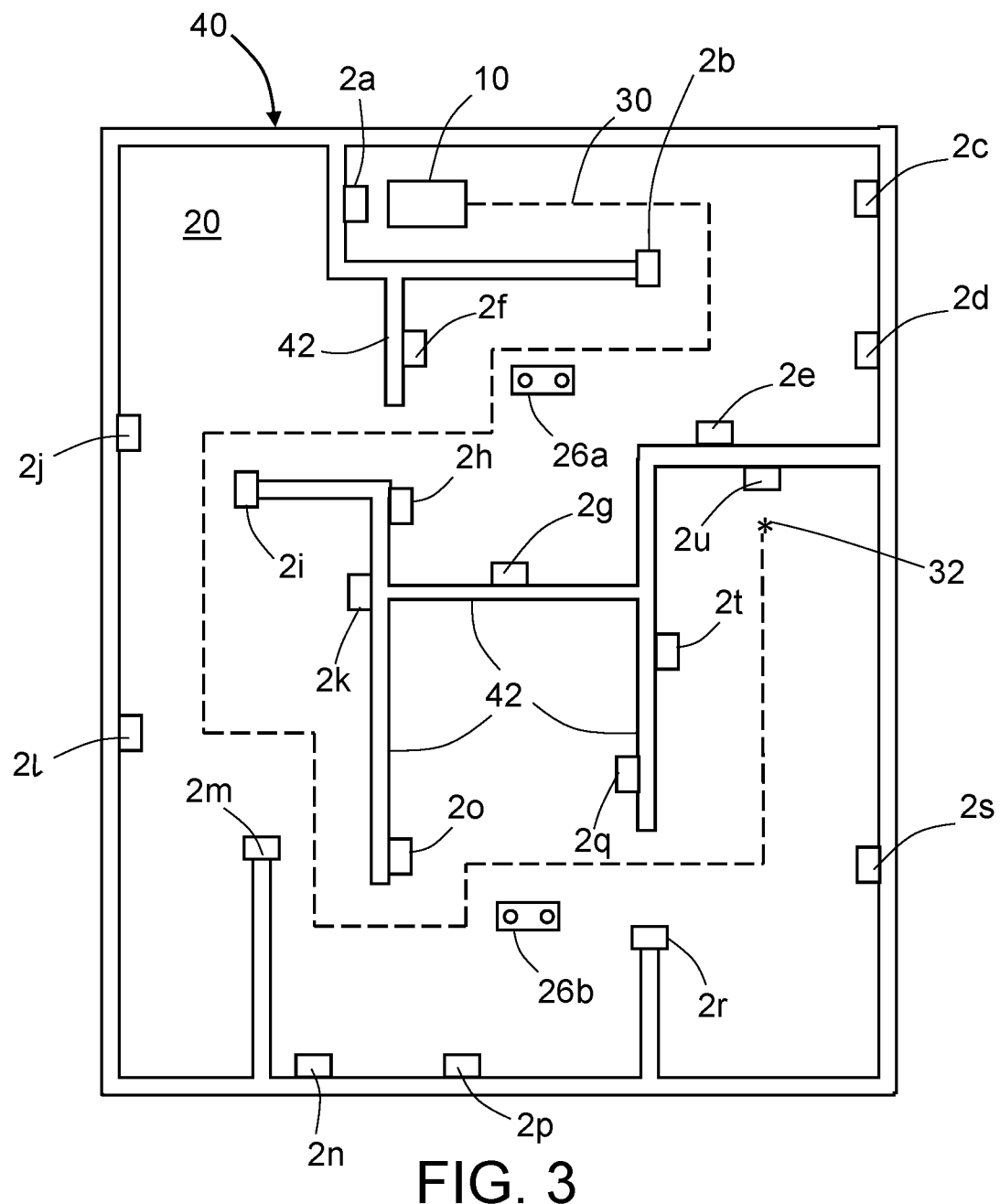
FIG. 3 is a diagram showing a floor plan of a generic factory with locations of cameras and access points for wirelessly communicating with an AGV that is configured to follow a fixed path (indicated by dashed lines).

FIG. 3 is a diagram showing a floor plan of a generic factory having a network of distributed cameras 2a-2u mounted to either an exterior wall 40 or one of a multiplicity of interior walls 42. However, it should be appreciated that the cameras may instead be mounted to any one or more of the following: ceilings, columns, walls above doors, and portable support structures placed on the floor of the factory. The particular locations of cameras 2a-2u were selected for the purpose of illustration only. It should be appreciated that the cameras 2a-2m could be placed at other locations.

Figure 4:
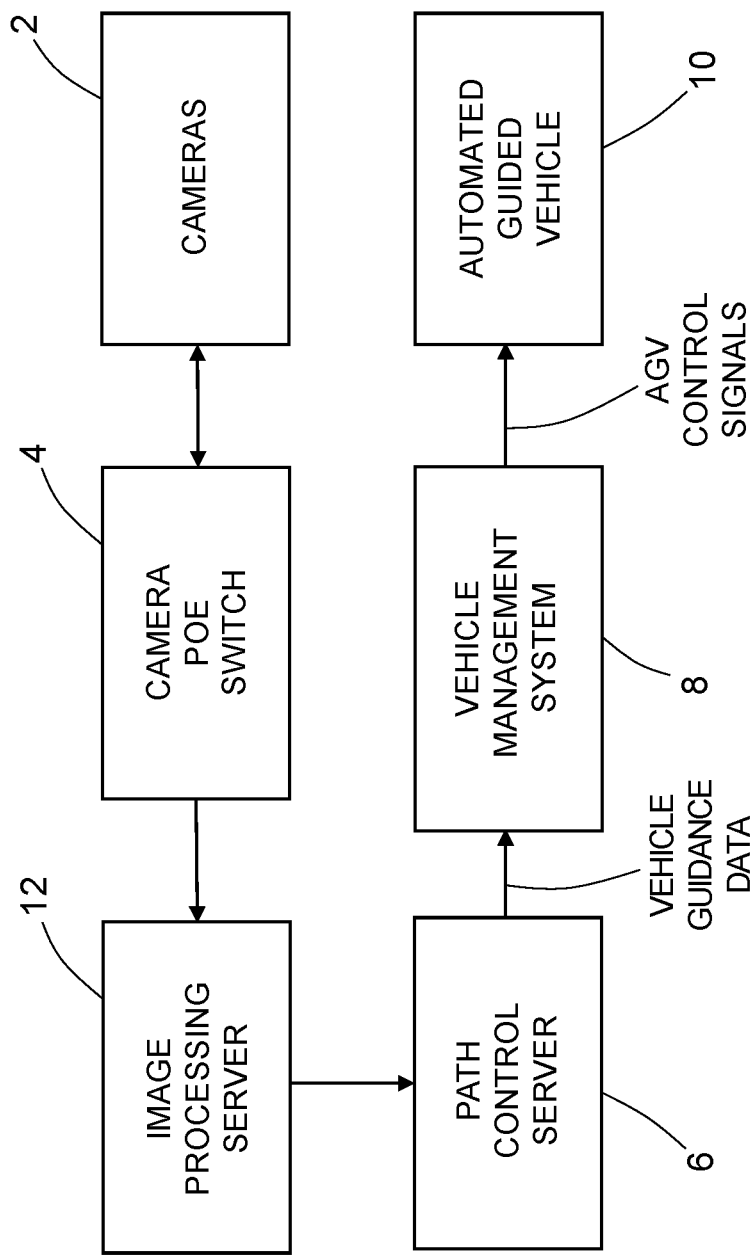
FIG. 4 is a block diagram identifying components of a system for monitoring an AGV along an entire planned path and sending alert messages to initiate delays, reroute, or emergency stop to avoid collision.

Although not indicated in FIG. 3, all of the cameras 2a-2u are connected to an Ethernet cable, which Ethernet cable is connected to a Power over Ethernet switch (hereinafter "camera POE switch 4" as indicated in FIG. 4). Power over Ethernet is a technology that enables network cables to carry electrical power. The cameras 2a-2u are POE-enabled so that they receive power via the same network connection used to send image data from the cameras 2a-2u to a processor (not shown in FIG. 3, but see path control server 6 in FIG. 4). In addition, each of cameras 2a-2u is a type of digital video camera commonly referred to as an "Internet protocol camera", meaning that it can send and receive data via a computer network and the Internet.

FIG. 3 also includes a dashed line representing a fixed path 30 on the factory floor 20 along which an AGV 10 is configured to travel. In the situation depicted in FIG. 3, the AGV 10 is initially located at one end of the fixed path 30 and can travel along the fixed path 30 to another end point 32 of the fixed path 30. When the AGV 10 reaches the end point 32, it can travel in the opposite direction along the same fixed path 30. Although in the example depicted in FIG. 3, the fixed path 30 comprises a series of straight path segments which intersect at right angles, the fixed path 30 is not limited to this geometry. For example, mutually orthogonal straight path segments could be connected by arc-shaped path segments or by straight path segments that lie along the hypotenuse of a right triangle having sides aligned with the mutually orthogonal straight path segments. Alternatively, the fixed path 30 could consist of straight and curved path segments or curved path segments only.

As the AGV 10 travels along the fixed path 30, the communications processor (not shown) onboard the AGV 10 communicates wirelessly with the closest wireless access point of a plurality of wireless access points 26 (see FIG. 10) having fixed locations in the factory. In the example depicted in FIG. 3, two wireless access points 26a and 26b are shown. However, any number of distributed wireless access points 26 can be provided. Each wireless access point 26a and 26b can be placed on the factory floor 20, suspended from a ceiling (not shown in FIG. 3) or mounted to an interior wall 42.

Although not shown in FIG. 3, other AGVs or objects may be present on the factory floor 20. The technology disclosed herein is particularly concerned with objects inside the factory which may be currently positioned on the fixed path 30 while the AGV 10 is moving toward the object. In some cases, the object will be stationary; in other cases the object is moving along the fixed path 30 in a direction toward the AGV 10 or in a direction away from the AGV 10, but at a sufficiently slower rate than the rate of the AGV 10 that a collision may ultimately occur. As used herein, the term "obstruction" should be construed broadly to encompass any one of these cases: i.e., an object that is stationary on the fixed path and toward which the AGV 10 is moving; or an object that is moving along the fixed path 30 and toward which the AGV 10 is moving, the object either moving in a direction opposite to the direction of movement of the AGV 10 or moving in the same direction at a sufficiently slow rate that the AGV 10 will overtake the object.

FIG. 4 is a block diagram identifying components of a system for monitoring an AGV 10 along any portion of a planned path (e.g., along the fixed path 30 depicted in FIG. 3) and sending alert messages to a vehicle management system 8 to initiate delays, reroute, or emergency stop to avoid collision. As used herein, the term "planned path" (as applied to AGVs only) means the portion of a fixed path that extends from the current position of the AGV to the destination of the AGV (which may be the end point 32 of the fixed path 30). The vehicle management system 8 is configured for controlling movement of the AGV 10, including sending control signals for altering the planned path of the AGV 10 when an obstruction is detected.

Still referring to FIG. 4, the system for guiding an AGV 10 further comprises a multiplicity of cameras 2 arranged to surveil an area intersected by the planned path of the AGV 10. To enable determination of the coordinates of the position of an object in the frame of reference of the factory, the position and orientation of each camera in the frame of reference of the factory are measured precisely. Preferably, each camera 2 has a field of view equal to 180 degrees. The cameras 2 are distributed in a way such that the system has visibility to the entire fixed path 30. In some instances, the cameras are arranged to create overlapping fields of view. The distributed cameras 2 are collectively able to cover an entire facility or workspace. Preferably some cameras 2 are located such that their fields of view are capable of encompassing non-line-of-sight obstructions beyond doorways and around corners.

The system depicted in FIG. 4 further comprises an image processing server 12 connected to receive the image data acquired by the multiplicity of cameras 4 during surveillance of the area. The cameras 2 provide partial views to the image processing server 12, which is configured to reconstruct the entire view and then dynamically update a two-dimensional map. More specifically, the image processing server 12 is configured to process the image data to detect a presence of and determine a current position of an object in the area. In accordance with at least some embodiments, the image processing server 12 is further configured to determine a current position of the AGV 10 along the planned path and to process the image data to detect a unique identifier on the AGV 10. More specifically, the image processing server 12 may be configured to perform a localization function whereby the current position of an object or an AGV is derived from the image data. Various methods for obtaining location information using a map constructed from image data acquired by cameras are known in the art. The concept employed in one such system is that object distances are calculated by a triangular relationship from two different camera images. For example, two images of the same object acquired from opposite directions can be combined into a single image using homography. The size and center position of the object image on the two-dimensional map can be calculated.

The system depicted in FIG. 4 further comprises a path control server 6 connected to receive processed data from the image processing server 12 and configured to determine whether the object has a current position relative to a position of the AGV 10 that violates a constraint or not, and if the object has a current position that violates the constraint, generate data representing vehicle guidance data. In accordance with at least some embodiments, the constraint is that the object not be in close proximity to the current position of the AGV 10, in which cases the path control server 6 is further configured to determine a current separation distance separating the object and the AGV 10 and then determine whether the separation distance is less than a specified threshold or not. When the separation distance is less than the specified threshold, at least some of the vehicle guidance data represents a command to initiate an emergency-stop procedure. In accordance with at least some embodiments, the constraint is that the object not be in an obstructing position along the planned path of the AGV 10, in which cases at least some of the vehicle guidance data represents a command to delay or slow down the AGV 10 when the object is in the obstructing position. In these embodiments, the path control server 6 is further configured to: determine a current time interval during which the object has been in the obstructing position; determine whether the current time interval is greater than a specified threshold or not; and if the current time interval exceeds the specified threshold, determine an alternative path for the AGV 10 that avoids the object, wherein at least some of the vehicle guidance data represent routing data for the alternative path.

The vehicle management system 8 is communicatively coupled to receive signals in a specified format that contain the vehicle guidance data and is configured to transmit control signals to the AGV 10 which are a function of that vehicle guidance data. The AGV 10 is communicatively coupled to receive the control signals from the vehicle management system 8 and is configured to discontinue or alter a current movement in response to receipt of the control signals.

Figure 5:
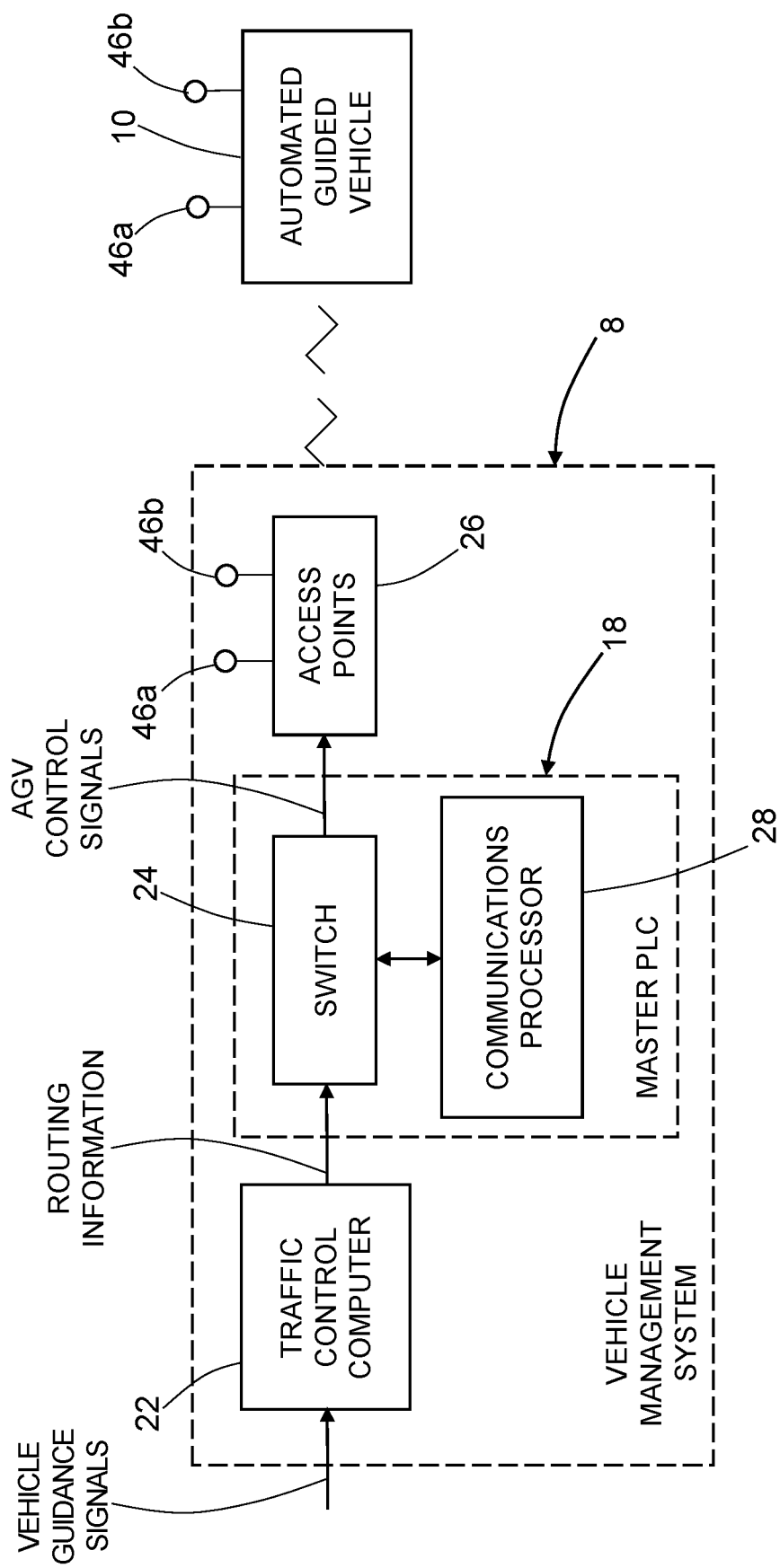
FIG. 5 is a block diagram identifying components of a vehicle monitoring system in accordance with some embodiments.

FIG. 5 identifies some components of a vehicle monitoring system 8 in accordance with one embodiment. The vehicle monitoring system 8 in this embodiment includes a traffic control computer 22 (e.g., a personal computer) that is communicatively coupled via wired Ethernet connections to the path control server 6 for receiving vehicle guidance signals. The traffic control computer 22 is configured to output digital routing information which may or may not be dependent on the actionable information contained in the vehicle guidance data received from the path control server 6. In addition, vehicle monitoring system 8 includes a master programmable logic controller 18 (hereinafter "master PLC 18") that is communicatively coupled via wired Ethernet connections to the traffic control computer 22 for receiving the routing information. A programmable logic controller (a.k.a. programmable controller) is an industrial digital computer which has been ruggedized and adapted for the control of automated manufacturing processes. In this embodiment, the master PLC 18 is configured to output AGV control signals to an AGV 10 that conforms to the routing information received from the traffic control computer 22. In accordance with one implementation, the master PLC 18 consists of a switch 24 and a communications processor 28 that is coupled to switch 24 for two-way wired Ethernet communications therebetween.

The communications processor 28 is configured to receive routing information from the traffic control computer 22 via the switch 24, process that routing information, and then send AGV control signals to the AGV 10 and other AGVs (not shown) via the switch 24 and one or more access points 26. The switch 24 sends the AGV control signals to access points 26 via wired Ethernet connections, while each access point 26 broadcasts the same AGV control signals via a wireless Ethernet connection. More specifically, each access point 26 is configured to transmit radiofrequency signals via a transmitting antenna 44a and receive radiofrequency signals via a receiving antenna 44b. Similarly, each AGV 10 is configured to transmit radiofrequency signals via a transmitting antenna 46a and receive radiofrequency signals via a receiving antenna 46b.

The above-described technology enables an external system (i.e., the path control server 6) outside of the vehicle control to communicate with the vehicle management system 8 to add another layer of safety to the layer already incorporated in the AGV system. The system disclosed herein comprises a multiplicity of cameras with limited fields of view; however, when integrated they are capable of tracking the same objects as they pass from one field of view to another. The cameras 4 in combination provide image data that the image processing server 12 uses to integrate and map out the complete path with vehicles and other objects in the planned path of any autonomous vehicle.

The system is configured to provide a generic solution that is not dependent on a particular autonomous vehicle brand, make, or model. Vehicle control systems have interfaces configured to exchange messages in a two-way format.

As an example, the vehicle speed can be communicated from the vehicle management system 8 to the path control server 6 and utilized with load size and path status to initiate alert messages back to the vehicle management system 8 for suggested delay, reroute or initiation of an emergency stop procedure.

Figure 6:
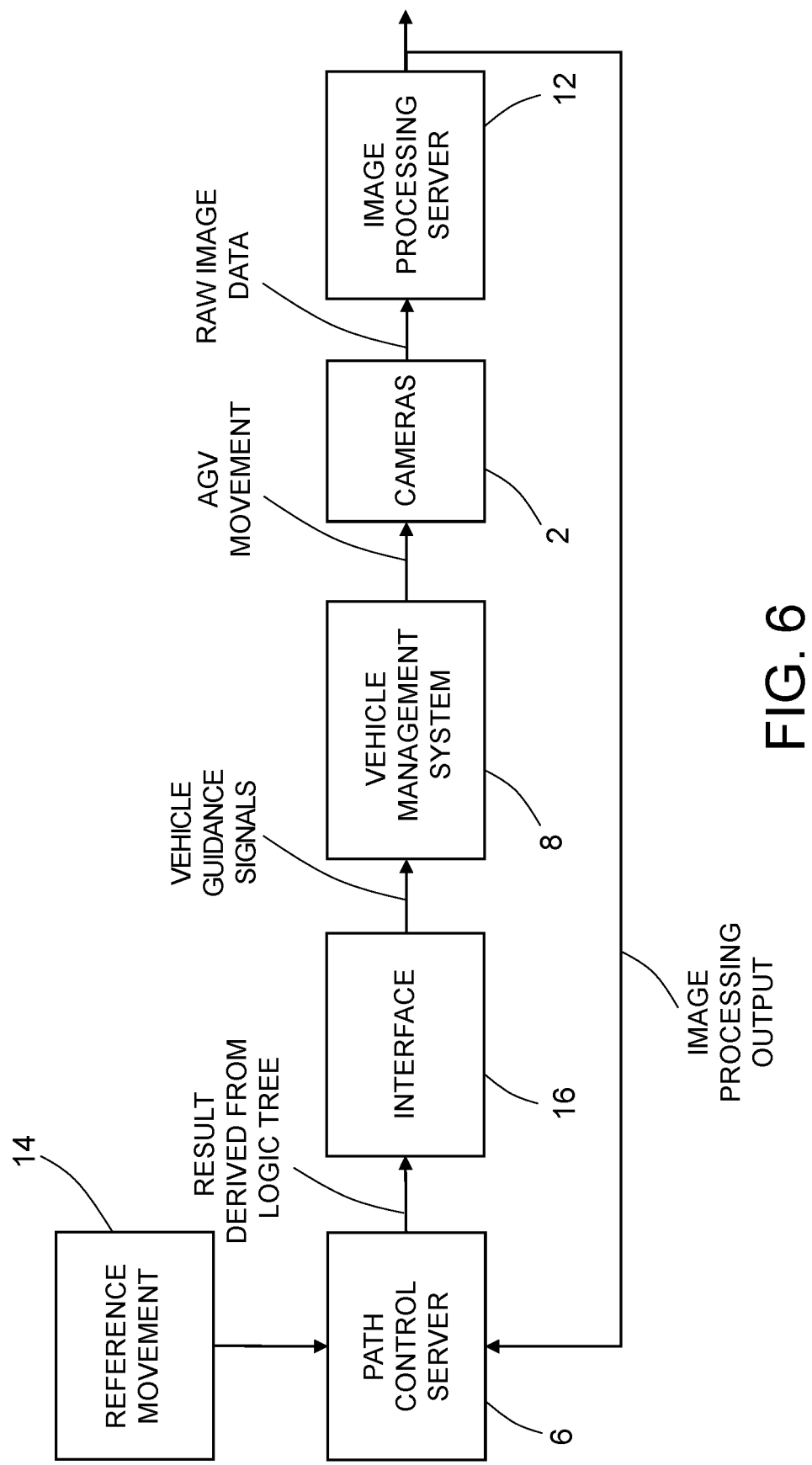
FIG. 6 is a block diagram identifying additional components of a system for monitoring an AGV along an entire planned path and sending alert messages to initiate delays, reroute, or emergency stop to avoid collision.

FIG. 6 is a block diagram identifying additional components (e.g., interface 16 of a system for monitoring an AGV along an entire planned path and sending alert messages to initiate delays, reroute, or emergency stop to avoid collision. The system initiates alternative paths when the primary path is blocked and is capable of reporting the vehicle position and identification number along the path. The technology disclosed herein can be used to control AGVs or mobile robots to provide an alternative safe path or to cause the vehicle to slow down when the primary path of an autonomous vehicle is blocked by an obstacle or when a collision is imminent.

Referring to FIG. 6, the image processing server 12 is a computer system configured to receive image data from a multiplicity of distributed cameras 2 and then process that image data (including extracting actionable intelligence from the image data). More specifically, the image processing server 12 is connected to receive image data acquired by the multiplicity of cameras 2 during surveillance of an area which is intersected by the AGV path. In addition, the image processing server 12 is configured to process the image data to detect a presence of and determine a current position of an object in the area. The image data is analyzed and the results of the analysis are pushed to the path control server 6 for storage and further processing. The data flow out of the image processing server 12 may also be sent to external networks to provide other capabilities.

The path control server 6 is a computer system configured to receive the image processing output from the image processing server 12 and then output vehicle guidance data which is a function of the image processing results using a logic tree. More specifically, the path control server 6 is connected to receive processed data from the image processing server 12 and configured to determine whether the object has a current position relative to a position of the AGV 10 that violates a constraint or not, and if the object has a current position that violates the constraint, generate data representing vehicle guidance information. The path control server 6 advises the vehicle management system 8 regarding the overall status of the AGV path and provides detailed control actions in order to avoid near-miss or emergency situations.

The interface 16 is the communications protocol and data that is passed from the path control server 6 to the vehicle management system 8. The interface 16 is configured to convert the data from the path control server 6 into vehicle guidance signals having a format acceptable to the vehicle management system 8. Different interfaces can be configured to enable the path control server 6 to communicate with vehicle management systems commercially available from different AGV suppliers.

The vehicle management system 8 is configured to control the AGV system. It provides operating instructions and diagnostics to any vehicles and to remote computers on the network. In accordance with the embodiments disclosed herein, the vehicle management system 8 is communicatively coupled to receive the vehicle guidance signals from the interface 16 and is configured to transmit control signals to the AGV 10 which are a function of the received vehicle guidance signals. Since the vehicle management system 8 is supplier-specific, the interface 16 is configured to address this issue by receiving data in a common format and then converting it to the specific format required by the supplier-specific vehicle management system. The vehicle guidance signals output by the interface 16 enter the vehicle management system 8 via an EtherCAT (Ethernet for Control Automation Technology) connection. These vehicle guidance signals include advice or commands, which the vehicle management system 8 may accept or reject. More specifically, the vehicle guidance signals may include AGV path status (i.e., clear or obstructed), the identification and position of the AGV 10, the position of an obstacle, and logic-based advice on future actions. The system disclosed herein has the ability to oversee an entire planned path of an autonomous vehicle. The AGV 10 is communicatively coupled to receive the control signals from the vehicle management system 8 and is configured to discontinue or alter a current movement in response to receipt of the control signals.

As subsequent raw image data is received from the cameras 4, that data can be processed by the image processing server 12 to detect an updated position resulting from the subsequent movement by the AGV 10. This data representing current movements and paths of the AGV 10 is received by the path control server 6, which compares the incoming data to stored data representing the pre-programmed paths and headings. The data representing the pre-programmed paths and headings (i.e., reference movements 14 in FIG. 6) is loaded onto the path control server 6 to reference a nominal state. In order to make a logical decision, the path control server 6 is configured to refer to this database which references the baseline AGV path layout and programs. The path control server 6 is configured to output results in dependence on observed deviations from nominal operations and iterative camera input back into the system.

In accordance with some embodiments, the path control server 6 is configured with an algorithm that can determine the precise location of the AGV 10 at every point during travel from one end to the other end of fixed path 30. The path control server 6 is also configured with an algorithm that can determine the precise location of any obstacle 202 (see FIG. 1) that may appear in the camera images. In addition, the path control server 6 is configured with an algorithm that can determine the separation distance separating the AGV 10 and obstacle 202 at every moment in time. The path control server 6 is further configured with an algorithm that can determine what control action to take when the estimated separation distance becomes less than a specified threshold. Typically the control action is to trigger the transmission of vehicle guidance signals to the vehicle management system 8, which vehicle guidance signals contain digital information representing a recommended action to be taken, for example, delay, reroute, or emergency stop the AGV 10 to avoid collision. Other algorithms may be executed for the purpose of extracting other types of actionable information from the camera image data. For example, pattern recognition algorithms well known in the art can be employed. In particular, such pattern recognition algorithms can be used to detect a visible identification pattern applied on a surface of the AGV 10 that is within the field of view of at least one camera 2.

Figure 7:
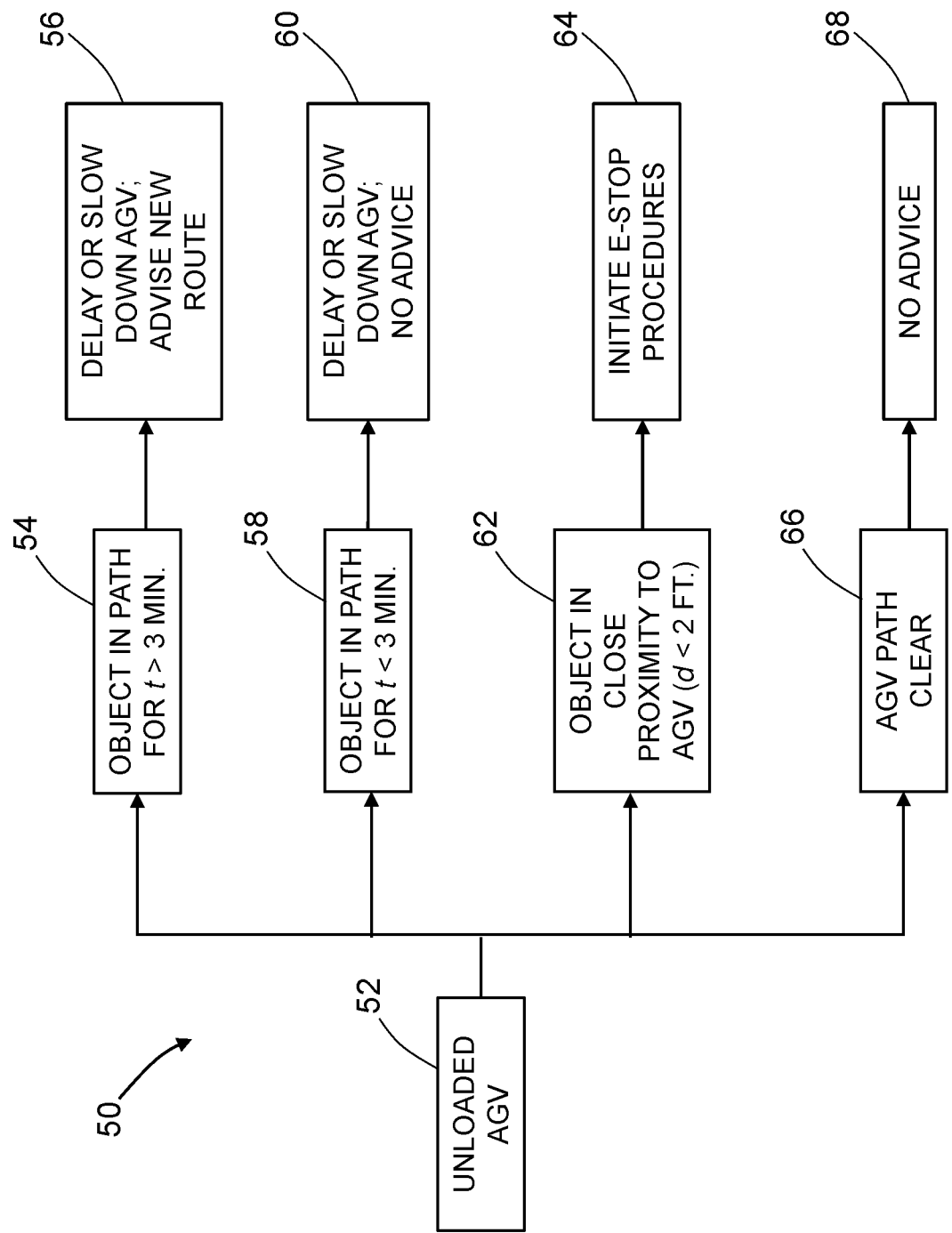
FIG. 7 is a flowchart identifying steps of a logic-based decision-making process for determining an action to be taken to control an unloaded AGV in dependence on a status (e.g., clear or obstructed) of a planned path of the unloaded AGV.

FIG. 7 is a flowchart identifying steps of a logic-based decision-making process 50 (also referred to herein as a "logic tree") for determining an action to be taken to control an unloaded AGV 52 in dependence on a status (e.g., clear or obstructed) of a planned path of the unloaded AGV 52. This logic-based decision-making process 50, which is performed by the path control server 6, comprises the following logical decisions and actions.

First, the path control server 6 determines whether there is an object in an obstructing position along the planned path of the unloaded AGV 52. If there is an object in an obstructing position, the path control server 6 determines the current time interval during which the object has been in the obstructing position. A determination is then made whether the current time interval is greater than or less than a specified threshold (e.g., 3 minutes). In accordance with the logic depicted in FIG. 7, if the current time interval t of the obstruction is less than three minutes (status 58), then the path control server 6 generates vehicle guidance data representing a command to delay or slow down the unloaded AGV 52 (action 60). This vehicle guidance data does not include advice concerning an alternative route. In contrast, if the current time interval t of the obstruction is greater than three minutes (status 54), then the path control server 6 generates vehicle guidance data representing a command to delay or slow down the unloaded AGV 52 and further comprising routing data representing an alternative path (action 56). The path control server 6 is further configured to determine a current separation distance d separating the object and the unloaded AGV 52 and then determine whether the separation distance d is less than a specified threshold (e.g., 2 ft) or not. If the separation distance is less than the specified threshold (e.g., d<2 ft), i.e., the object is in close proximity (status 62), then the path control server 6 generates vehicle guidance data representing a command to initiate an emergency-stop procedure (action 64). If the AGV path is clear (status 66), then the path control server 6 does not generate any vehicle guidance data representing an action to be taken or an alternative path to be followed (action 68).

Figure 8:
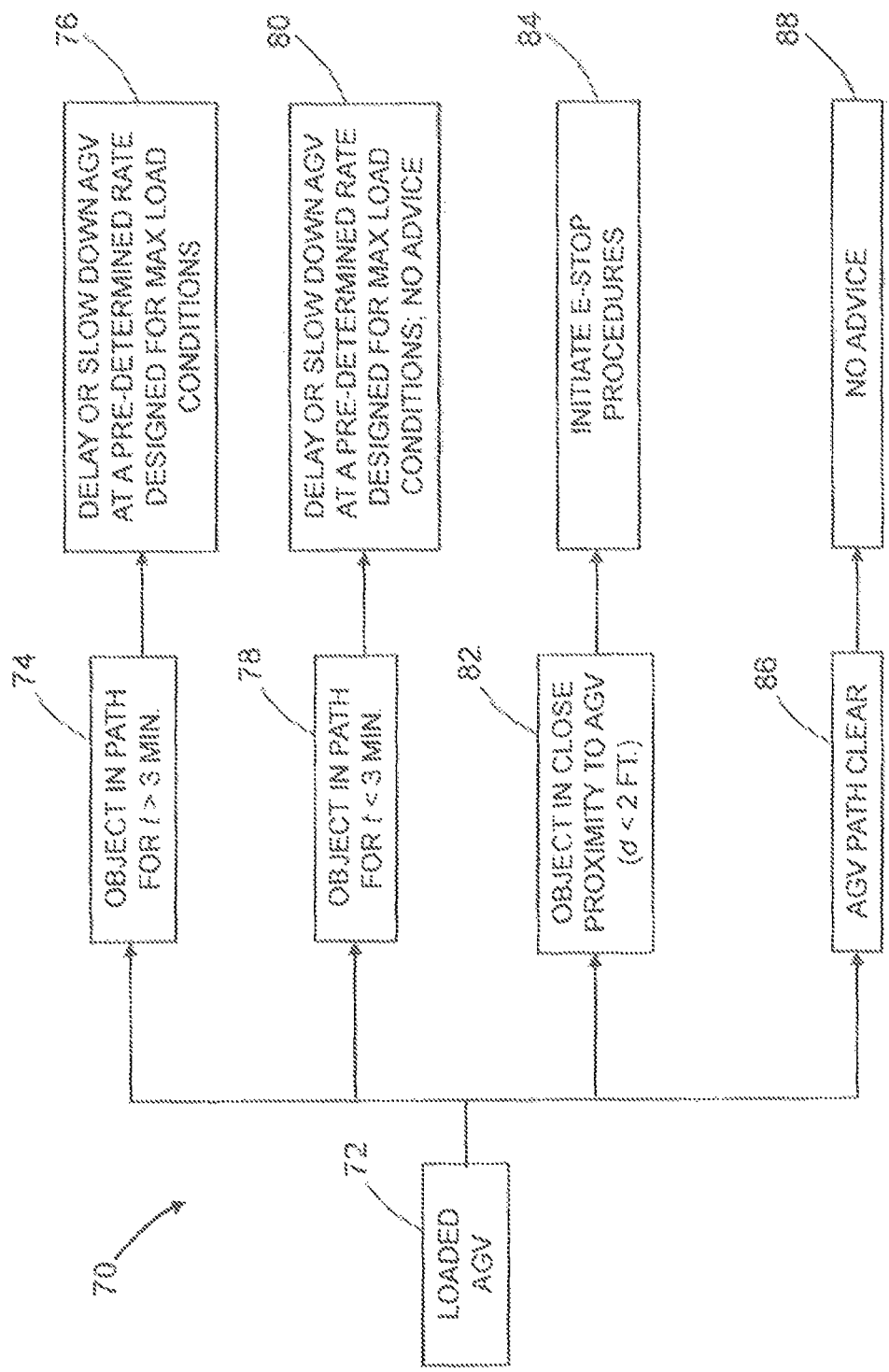
FIG. 8 is a flowchart identifying steps of a logic-based decision-making process for determining an action to be taken to control a loaded AGV in dependence on a status (e.g., clear or obstructed) of a planned path of the loaded AGV.

FIG. 8 is a flowchart identifying steps of a logic-based decision-making process 70 (also referred to herein as a "logic tree") for determining an action to be taken to control a loaded AGV 72 in dependence on a status (e.g., clear or obstructed) of a planned path of the loaded AGV 72. This logic-based decision-making process 70, which is performed by the path control server 6, comprises the following logical decisions and actions.

First, the path control server 6 determines whether there is an object in an obstructing position along the planned path of the loaded AGV 72. If there is an object in an obstructing position, the path control server 6 determines the current time interval during which the object has been in the obstructing position. A determination is then made whether the current time interval is greater than or less than a specified threshold (e.g., 3 minutes). In accordance with the logic depicted in FIG. 8, if the current time interval t of the obstruction is less than three minutes (status 78), then the path control server 6 generates vehicle guidance data representing a command to delay or slow down the loaded AGV 72 (action 80) at a predetermined rate designed for maximum loading conditions. This vehicle guidance data does not include advice concerning an alternative route. In contrast, if the current time interval t of the obstruction is greater than three minutes (status 74), then the path control server 6 generates vehicle guidance data representing a command to delay or slow down the loaded AGV 72 at a predetermined rate designed for maximum loading conditions and further comprising routing data representing an alternative path (action 76). The path control server 6 is further configured to determine a current separation distance d separating the object and the loaded AGV 72 and then determine whether the separation distance d is less than a specified threshold (e.g., 2 ft) or not. If the separation distance is less than the specified threshold (e.g., d<2 ft), i.e., the object is in close proximity (status 82), then the path control server 6 generates vehicle guidance data representing a command to initiate an emergency-stop procedure (action 84). If the AGV path is clear (status 86), then the path control server 6 does not generate any vehicle guidance data representing an action to be taken or an alternative path to be followed (action 88).

A loaded AGV 72 traversing a straight path will result in different calculated deceleration rates than a load AGV moving along a curved path due to AGV programming. A typical AGV can traverse corners and curves at the same speed as the speed at which it traverses a straight path, but to maintain accuracy, the AGV programming reduces the maximum speed of the vehicle.

Figure 9A:
FIG. 9A is a diagram showing that a time $t_1$ to initiate an emergency stop is selected to precede a time at which a collision will occur by an interval of time that is greater than the interval of time needed to stop a fully loaded AGV that is moving at maximum speed.
Figure 9B:
FIG. 9B is a diagram showing that a time $t_2$ to initiate a delay is selected to precede the time to initiate an emergency stop depicted in FIG. 9A.
Figure 9C:
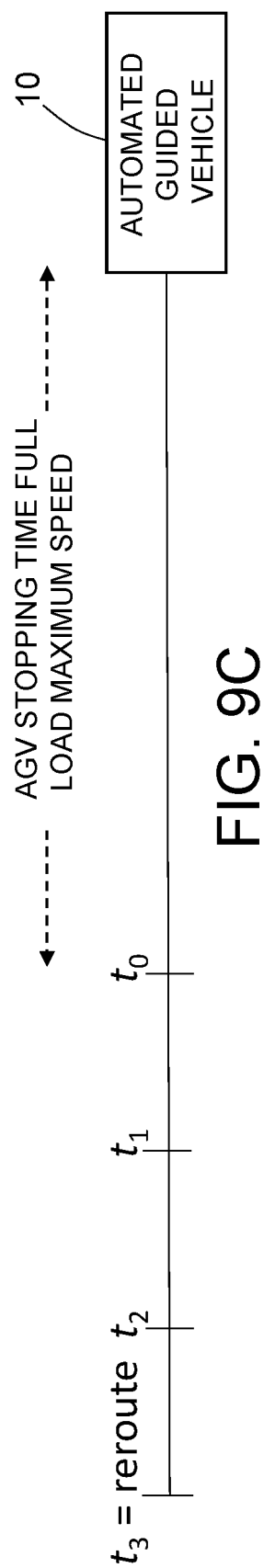
FIG. 9C is a diagram showing that a time $t_3$ to initiate a reroute is selected to precede the time to initiate a delay depicted in FIG. 9B.

The timing for the issuance of vehicle guidance signals will vary in dependence on the type of action to be taken. FIG. 9A is a diagram showing that a time $t_1$ to initiate an emergency stop is selected to precede a time at which a collision will occur by an interval of time that is greater than the interval of time needed to stop a fully loaded AGV that is moving at maximum speed. FIG. 9B is a diagram showing that a time $t_2$ to initiate a delay is selected to precede the time $t_1$ to initiate an emergency stop depicted in FIG. 9A. FIG. 9C is a diagram showing that a time $t_3$ to initiate a reroute is selected to precede the time $t_2$ to initiate a delay depicted in FIG. 9B.

Figure 10:
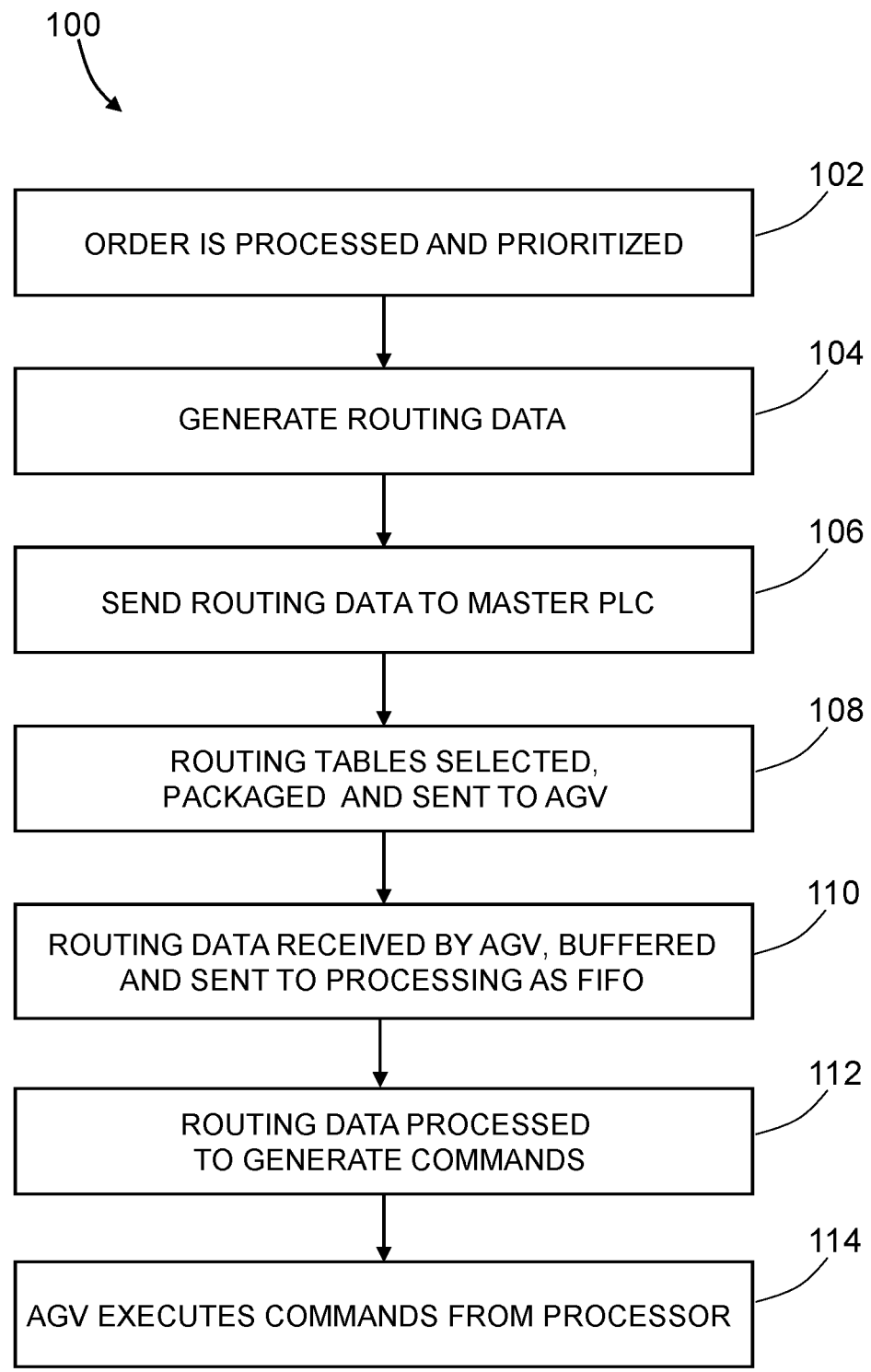
FIG. 10 is a flowchart identifying steps of a method for rerouting an AGV in accordance with one embodiment.

FIG. 10 is a flowchart identifying steps of a method 100 for rerouting an AGV 10 in accordance with one embodiment. The path control server 6 is configured to process and prioritize each order or command (step 102) and then generate routing data (step 104). That routing data is then sent to the master PLC 18 (step 106) as part of the information carried by the vehicle guidance signals output by the interface 16. The master PLC 18 then selects a routing table, packages it and sends the package to an AGV 10 via an access point 26. If the AGV 10 moves from the coverage range (cell) of one access point 26 to the coverage range (cell) of another access point 26, the wireless connection is maintained (this is called roaming). The routing data is received by the AGV 10, buffered and sent to an onboard processor for processing on a first in/first out basis (step 110). The onboard processor processes the routing data to generate commands (step 112). The appropriate actuators onboard the AGV 10 then execute those commands (step 114) in a manner that causes the AGV 10 to follow the alternative path.

As disclosed in some detail hereinabove, the cameras 2 and image processing server 12 capture the details and information needed for integrated logic-based decision-making. Images captured by the cameras 2 are entered into object and location detection algorithms (executed by the image processing server 12), which process the image data to determine what types of objects are in motion and in the predetermined AGV path. A code pattern or fiducial marker imprinted on the AGV 10 enables the system to image processing server 12 separate an AGV 10 from any other object. This allows the software running on the path control server 6 to utilize the baseline AGV path to predict future events and advise the AGV control software running on the traffic control computer 22 (see FIG. 5) on isolated events.

A respective code pattern marker can be applied on a surface of each AGV 10. The payload in each code pattern marker contains a unique identifier identifying each AGV 10. The cameras 2 acquire images of the environment, including any code pattern markers within their fields of view. The image processing server 12 is configured to read and decode the AGV identification codes printed on the code pattern markers.

Figure 11:
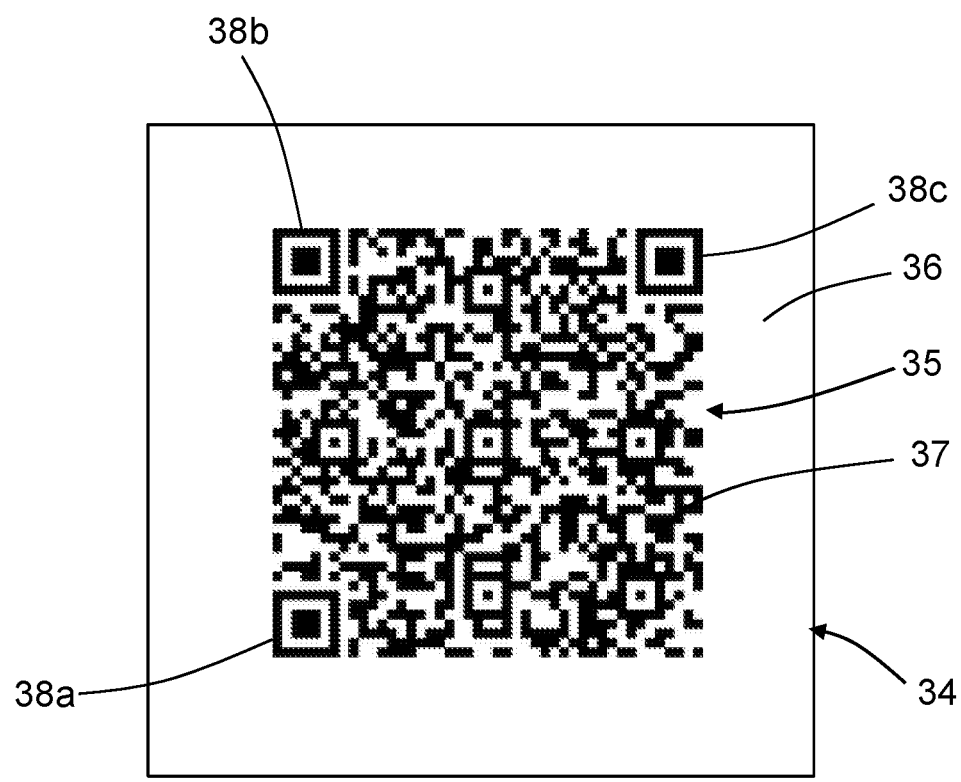
FIG. 11 is a diagram representing one example of a QR code pattern marker.

One example of a suitable commercially available code pattern is a QR code. QR codes are a type of two-dimensional barcode (a.k.a. matrix barcode) which have integrated registration fiducial symbols (a.k.a. registration marks). FIG. 11 is a diagram representing one example of a QR code pattern marker 34. The QR code pattern marker 34 comprises a flexible substrate 36 having a QR code pattern 35 printed thereon. The QR code pattern 35 comprises a payload 37 consisting of data that identifies the AGV 10 to which the QR code pattern marker 34 is adhered to. In addition, the QR code pattern 35 comprises a registration fiducial symbol 38$a$ in a lower left-hand corner of the code pattern, a registration fiducial symbol 38$b$ in an upper left-hand corner of the code pattern, and a registration fiducial symbol 38$c$ in an upper right-hand corner of the code pattern.

While systems and methods for guiding autonomous vehicles have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for guiding an autonomous vehicle, the system comprising:

an autonomous vehicle configured to travel along a path intersecting an area;

a camera oriented toward the path;

an image processing server configured to receive and process image data acquired by the camera to determine a position of an object in the area;

a path control server configured to receive processed data from the image processing server and configured to generate vehicle guidance information when the path control server determines at least one of the following: (a) that the object is in close proximity to the autonomous vehicle, and (b) that the object is in an obstructing position along the path of the autonomous vehicle; and a vehicle management system configured to receive the vehicle guidance information and to transmit corresponding control signals to the autonomous vehicle, wherein the autonomous vehicle is configured to alter a current movement in response to receipt of the control signals.

2. The system as recited in claim 1, further including an interface configured to convert the vehicle guidance information received from the path control server into a format acceptable to the vehicle management system.

3. The system as recited in claim 2, wherein the image processing server is further configured to process the image data to detect a unique identifier on the autonomous vehicle; and wherein the interface is further configured to generate vehicle identification signals representing the unique identifier, the vehicle identification signals being in a format acceptable to the vehicle management system.

4. The system as recited in claim 1, wherein the image processing server is further configured to determine a current position of the autonomous vehicle along the path.

5. The system as recited in claim 4, wherein the path control server is further configured to determine a distance between the object and the current position of the autonomous vehicle and then determine when the distance is less than a specified threshold, wherein when the distance is less than the specified threshold, at least some of the vehicle guidance information generated represents a command to initiate an emergency-stop procedure at the autonomous vehicle.

6. The system of claim 1, wherein when the path control server determines the object is in the obstructing position along the path of the autonomous vehicle, at least some of the vehicle guidance information generated represents a command to at least one of delay and slow down the autonomous vehicle.

7. The system of claim 6, wherein the path control server is further configured to:

determine a current time interval during which the object has been in the obstructing position;

determine when the current time interval exceeds a specified threshold; and when the current time interval exceeds the specified threshold, determine an alternative path for the autonomous vehicle that avoids the object, wherein at least some of the vehicle guidance information generated represents routing data for the alternative path.

8. The system as recited in claim 1, wherein the autonomous vehicle is an automated guided vehicle.

9. The system as recited in claim 1, wherein the autonomous vehicle is a mobile robot.

10. A method for guiding an autonomous vehicle in an area, the area including a path and a camera oriented toward the path, the autonomous vehicle configured to travel along the path, the method comprising:

acquiring image data using the camera;

processing the image data to determine a position of an object in the area;

determining at least one of the following: (a) that the object is in close proximity to the autonomous vehicle and (b) that the object is in an obstructing position along the path of the autonomous vehicle;

generating data representing vehicle guidance information;

converting the vehicle guidance information into corresponding control signals;

transmitting the control signals to the autonomous vehicle; and altering a current movement of the autonomous vehicle in response to receipt of the control signals.

11. The method as recited in claim 10, further comprising determining a current position of the autonomous vehicle along the path.

12. The method as recited in claim 11, wherein the determining that the object is in close proximity to the autonomous vehicle further comprises:

determining a distance between the object and the current position of the autonomous vehicle; and determining when the distance is less than a specified threshold, wherein when the distance is less than the specified threshold, at least some of the vehicle guidance information generated represents a command to initiate an emergency-stop procedure at the autonomous vehicle.

13. The method as recited in claim 10, wherein after determining that the object is in an obstructing position along the path of the autonomous vehicle, at least some of the vehicle guidance information generated represents a command to at least one of delay and slow down the autonomous vehicle.

14. The method as recited in claim 13, further comprising processing the image data to determine whether the autonomous vehicle is loaded or unloaded, wherein when the autonomous vehicle is loaded, then the command to slow down the autonomous vehicle includes a predetermined slow down rate designed for maximum load conditions.

15. The method as recited in claim 13, further comprising:

determining a current time interval during which the object has been in the obstructing position;

determining when the current time interval exceeds a specified threshold; and when the current time interval exceeds the specified threshold, determining an alternative path for the autonomous vehicle that avoids the object, wherein at least some of the vehicle guidance information generated represents routing data for the alternative path.

16. The method as recited in claim 10, further comprising:

processing the image data to detect a unique identifier on the autonomous vehicle;

generating vehicle identification signals representing the unique identifier, the vehicle identification signals having a format acceptable to a vehicle management system; and transmitting the vehicle identification signals to the vehicle management system along with the vehicle guidance information.

17. The method as recited in claim 10, wherein the autonomous vehicle is an automated guided vehicle.

18. The method as recited in claim 10, wherein the autonomous vehicle is a mobile robot.

19. A method for guiding an autonomous vehicle in an area, the area including a path and a camera oriented toward the path, the autonomous vehicle configured to travel along the path, the method comprising:
- acquiring image data using the camera;
- processing the image data to determine a position of an object in the area;
- determining that the object is at least one of the following:
  - (a) in close proximity to the autonomous vehicle and
  - (b) in an obstructing position along the path of the autonomous vehicle;
- generating data representing vehicle guidance information;
- transmitting control signals, which are a function of the vehicle guidance information and configured to control movement of the autonomous vehicle, to the autonomous vehicle; and
- altering a current movement of the autonomous vehicle in response to receipt of the control signals.

20. The method of claim 19, further comprising:
- converting the vehicle guidance information into a format acceptable to a vehicle management system; and
- transmitting the vehicle guidance information to the vehicle management system, the vehicle management system being configured receive the vehicle guidance information and to transmit corresponding control signals to the autonomous vehicle.

* * * * *